3,337,650
PROCESS FOR PREPARING GRAFT POLYMERS HAVING HIGH IMPACT STRENGTH
Richard H. Marcil, Plainfield, N.J., assignor to Union Carbide Corporation, a corporation of New York
No Drawing. Continuation of application Ser. No. 279,598, May 10, 1963. This application Dec. 9, 1966, Ser. No. 600,656
10 Claims. (Cl. 260—880)

The instant application is a continuation of U.S. application Serial No. 279,598 filed May 10, 1963, now abandoned.

This invention relates to a process for preparing impact resistant multicomponent graft polymers onto polymeric/butadiene rubbers. More particularly, the invention relates to a two-stage process for preparation of high impact strength graft polymers of a styrene and acrylonitrile onto butadiene/styrene copolymers.

It is known that styrene and acrylonitrile can be graft polymerized onto a butadiene-containing polymeric composition to yield tough, rigid products. According to British Patent 649,166 (1951), a thermoplastic styrene/acrylonitrile graft polymer can be prepared by polymerizing monomeric styrene and acrylonitrile onto a butadiene/styrene copolymer. These graft polymers are hard and non-elastic at ordinary temperatures, but are brittle and have low impact strengths at low temperatures.

More recently it has been disclosed (Fremon and Stoops, British Patent 744,455, 1956) that improved graft polymers can be prepared by graft polymerizing styrene and acrylonitrile onto polybutadiene. These graft polymers have good mechanical properties, in particular high impact strength at low temperatures, but they are difficult to process because of their toughness and strength at elevated temperatures. Kneading, milling, and calendering of such products is accomplished only with difficulty and over long periods of time.

The hot processibility problems discussed above were solved (Schroeder, U.S. 2,948,703, 1960) by a process for preparing styrene/acrylonitrile graft polymers onto polybutadiene which comprised the steps of first forming a mixture of a latex of polymerized butadiene and of a styrene/acrylonitrile copolymer composed predominantly of combined styrene, then adding monomeric styrene and acrylonitrile to the mixture of latices, and polymerizing the monomers. This process, however, is complicated by the requirement of two different polymer emulsions, two monomer solutions, and a final combined polymerization, with resulting difficulty in handling and preparation which makes large-scale operations both physically complex and economically less than optimum.

Mixtures of styrene and acrylonitrile graft polymerized onto polybutadiene or butadiene/styrene copolymer thus produce compositions which are useful in typical thermoplastic polymer applications such as blow molded bottles, thin walled containers, telephone hand sets, refrigerator door liners, and the like.

It was observed that when styrene and acrylonitrile are graft polymerized onto butadiene/styrene copolymers at steady-state low solids conditions, i.e., less than 40 percent solids, a highly impact resistant product results. Graft polymerization of the same system at the more conventional, and more economically desirable, steady-stage high solids conditions, i.e., about 60 to 80 percent solids, however, produces an inferior product having low impact strength. Preparation of a polymer at a steady-state low solids condition is impractical, however, because large quantities of unreacted monomer must be stripped from the product, condensed, and recycled after being reconstituted to the proper proportions for reaction.

There has now been discovered a continuous, economical, process for preparation of graft polymers of styrene and acrylonitrile onto polymeric butadiene rubber which comprises using a steady-state low solids reactor in conjunction with a conventional steady-state high solids reactor. The graft copolymers produced surprisingly are as impact resistant as previously available polymers made entirely at low solids conditions. By carrying out the first part of the graft polymerization reaction at low solids a high conversion rate is achieved. The polymer in the low solids solution, if recovered, would have high impact strength, but the second stage of the reaction advances to high solids so that the final separation of graft polymer and unreacted monomer by devolatilization is minimized yet the high impact strength of the resultant product is maintained. The graft polymers of styrene and acrylonitrile onto polymeric butadiene rubber prepared by the process of this invention are superior to graft polymers of the same composition made entirely by bulk polymerization at steady-state low solids, particularly in respect to process economics. The graft polymers of the process of this invention are also prepared as economically as those of similar composition prepared entirely at steady-state high solids, but the physical properties of the present copolymers are superior to those prepared entirely at steady-state high solids. The products of the process of this invention are superior also to acrylonitrile/butadiene/styrene terpolymers having the same impact strength because they have higher tensile strengths and moduli, higher heat distortion temperatures, and are less subject to the deleterious effects of oxidation and sunlight.

By the term "polymeric butadiene rubber" is meant a normally solid polymer containing predominantly combined butadiene, the balance thereof comprising at least 50 percent by weight of a combined styrene, i.e., vinyl benzene and substituted vinyl benzenes, with the remaining portion of the balance being a combined olefinically unsaturated compound polymerizable therewith such as, for example, methyl methacrylate, acrylonitrile, ethyl acrylate, and the like. The preferred polymeric butadiene rubber contains from 0 to about 35 percent by weight combined styrene and from about 65 to 100 percent by weight combined butadiene. Those copolymers containing lesser amounts of combined styrene, i.e., less than about 35 percent by weight, are preferred as "backbones" for the graft polymer. The impact strength of the graft polymer increases as the combined styrene content of the backbone decreases, i.e., impact strength of the graft polymer increases primarily with increased backbone content and secondarily with decreased styrene content in the backbone itself, particularly as the temperature at which there is subjection to impact is decreased from room temperature.

To prepare the graft polymer of styrene and acrylonitrile onto polymeric butadiene rubber, the rubber is first dissolved in a solution of styrene and acrylonitrile monomers being predominantly styrene, and generally being in a ratio of about 1.5 to 9 parts by weight of styrene per part by weight of acrylonitrile. It is preferred to employ between about 2 to 3 parts by weight styrene per part of acrylonitrile. If desired, a small amount of another copolymerizable monomer can be present as long as it does not adversely affect the properties of the resultant product. A liquid diluent, hereinafter discussed in detail, can also be added if desired. This mixture is then bulk polymerized in a two reactor system.

In the primary reactor of the two reactor system the steady-state solids are maintained at about 15 to 40, and preferably at about 25 to 35, percent by weight, by achieving a balance between the throughput rate and the reactor contents or inventory level.

The reaction mass is pumped from the primary reactor to a secondary reactor where the steady-state solids level is maintained at about 50 to 75, and preferably about 65 percent by weight solids. From the secondary reactor the reaction mass is pumped into any one of the standard devolatilizing devices well known in the art where unreacted monomer is removed from the graft polymer.

A typical suitable primary reactor is a conventional pipe reactor, i.e., an elongated chamber provided with suitable conduits, pumping, and heating means. Satisfactory product can also be prepared using an autoclave as a primary reactor. Because the reaction in the primary reactor is endothermic, and because of the high viscosity of the reaction mass, it is preferred that the velocity of the reaction mass across the heated surface be at a maximum. This is more easily and effectively accomplished in a pipe reactor than in an autoclave. A pipe reactor is therefore preferred as the primary reactor.

The secondary reactor for use in the invention is normally substantially larger than the primary reactor since the reaction rate for the second stage reaction is usually about 10 percent of the reaction rate in primary reactor, although this is not critical. It has been found that a stirred autoclave is particularly well suited for use as the secondary reactor, but it is not essential that such means be employed.

The amount of polymeric butadiene rubber dissolved into the feed mix ranges from about 5 percent to about 13 percent and depends upon the rubber content desired in the final graft polymer and upon the expected or desired steady-stage solids in the secondary reactor according to the following relationship:

$$\text{Percent by Weight Polymeric Butadiene Rubber in Graft Polymer} = 100 \times \frac{\text{Percent by Weight Polymeric Butadiene Rubber in Feed Mix}}{\text{Percent by Weight Total Solids in Secondary Reactor}}$$

An organic liquid diluent in the feed mix can be used to control the reaction rates in both the primary and secondary reactors. The amount of diluent used is not essential, but it has been observed that about 15 to 20 percent by weight keeps the reaction rate at a suitable level. Useful diluents in this invention are organic liquids in which the reactants are soluble and include such compounds as liquid aromatic hydrocarbon solvents containing from 6 to 10 carbon atoms inclusive, such as, for example, benzene, toluene, xylene, methyl ethyl ketone, ethyl benzene, para-cymene, cumene and the like. The preferred diluent is para-cymene because it reduces the melt viscosity of the graft polymer and it gives the graft polymer a smoother surface in fabricated parts.

Thermal or peroxide initiation of polymerization can be used with equal facility in the invention. Normally where peroxides are used as initiators the reaction temperature is lowered to control the reaction rate.

The following examples illustrate the practice of the invention.

The equipment used in the following examples consisted of, as the primary reactor, a loop of 1.25 inch ID pipe approximately 22 feet in length with a capacity for 14.3 pounds of reactants. An inlet was provided from a feed tank with metering pump. Steam jackets were placed around the pipe as necessary to maintain the reaction mixture at the desired temperature. A circulating pump in the loop provided a circulation rate of approximately 15 gallons per minute. An outlet from the pipe reactor provided with a metering discharge pump lead to a secondary reactor, an autoclave having a capacity of 100 gallons and provided with a suitable agitator. From the secondary reactor the products were removed to a devolatilizer and then passed to a dicer.

Polymerization of Example 1 was conducted as follows: 8.0 parts by weight butadiene/styrene copolymer comprising 23 percent by weight combined styrene and the balance combined butadiene was dissolved in a monomer mixture comprising 50.4 parts by weight styrene and 21.6 parts by weight acrylonitrile, and 20 parts by weight toluene as a diluent. This reaction mixture was pumped from a reservoir to a pipe reactor, an elongated chamber as described above provided with conduits, pumping, and heating means such that the velocity of the reaction solution across the surface of the reactor, heated to 151° C. was sufficient to provide a mixture containing 39.7 percent by weight polymerized solids. This reaction mixture was then pumped to a stirred autoclave heated to 150° C. wherein polymerization was continued until the reaction mixture comprised 63 percent by weight solids. The reaction mixture was then pumped to a devolatilizing device where unreacted monomer and solvent were stripped from the polymer product. The recovered monomer and solvent could be reconstituted to their original concentration in the reaction mixture and used for subsequent polymerization.

Polymerization of Example 2 was conducted as follows: 12.0 parts by weight butadiene/styrene copolymer comprising 23 percent by weight combined styrene and the balance combined butadiene was dissolved in a monomer mixture comprising 47.6 parts by weight styrene and 20.4 parts by weight acrylonitrile, and 20.0 parts by weight toluene as a diluent. This reaction mixture was pumped from a reservoir to a pipe reactor, an elongated chamber as described above provided with conduits, pumping, and heating means such that the velocity of the reaction solution across the surface of the reactor, heated to 151° C., was sufficient to provide a mixture containing 30.4 percent by weight polymerized solids. This reaction mixture was then pumped to a stirred autoclave heated to 150° C. wherein polymerization was continued until the reaction mixture comprised 68 percent by weight solids. The reaction mixture was then pumped to a devolatilizing device where unreacted monomer and solvent were stripped from polymer product. The recovered monomer and solvent could be reconstituted to their original concentration in the reaction mixture and used for subsequent polymerization.

The controls were prepared by procedures similar to those described above for Examples 1 and 2 except that in controls 1, 2, and 3, only a single reactor, either primary (control 3) or secondary (controls 1 and 2), was used for polymerization of a graft polymer of styrene and acrylonitrile onto polymeric butadiene rubber. In controls 1 and 2, where the reaction is conducted to high solids, graft polymers having low impact strength were obtained. Control 3 shows the high impact strength of the graft polymer prepared by using only a primary reactor to carry the graft polymerization reaction to low solids.

In the examples, the graft polymerization were conducted using a steady-state low solids reactor in conjunction with a steady-state high solids reactor. The impact strength of the resulting graft polymer in Example 2 is equal to that of the graft polymer prepared in control 3 although control 3 was carried to only 32.1 percent by weight solids and the example was carried to 68 percent by weight solids.

Example 1 shows that the impact strength of a low rubber content graft polymer prepared by the process of the invention exceeds the impact strength of both control 1 and control 2 despite the disadvantage of the example's low rubber content. The graft polymer prepared in Example 2 is intermediate in rubber content but is greatly superior to both control 1 and control 2 in impact strength. Comparison of the impact strengths of the graft polymers prepared in Examples 1 and 2 shows the effect of product rubber content on impact strength.

TABLE I

| Components, Percent by Weight | Control 1 | Control 2 | Control 3 | Example 1 | Example 2 |
|---|---|---|---|---|---|
| Styrene | 49.9 | 48.3 | 52.2 | 50.4 | 47.6 |
| Acrylonitrile | 22.1 | 21.3 | 22.4 | 21.6 | 20.4 |
| Toluene | 18.0 | 17.4 | 20.0 | 20.0 | 20.0 |
| Butadiene/Styrene Copolymer (23 percent by weight combined styrene) | 10.0 | 13.0 | 5.4 | 8.0 | 12.0 |
| Primary Reactor, Temperature, ° C | | | 151 | 151 | 151 |
| Primary Reactor, Percent by Weight Solids | | | 32.1 | 39.7 | 30.4 |
| Secondary Reactor, Temperature, ° C | 150 | 150 | | 150 | 150 |
| Secondary Reactor, Percent by Weight Solids | 65 | 67 | | 63 | 68 |
| Percent by Weight Butadiene/Styrene Copolymer in Product | 15.3 | 19.7 | 16.8 | 12.7 | 17.6 |
| Izod Impact [1] | 0.66 | 0.73 | 9.98 | 1.96 | 9.95 |

[1] Izod Impact Test: ASTM D-256-56 using ⅛ inch compression molded specimens at 23° C.

I claim:
1. Process for the preparation of high impact strength acrylonitrile/butadiene/styrene polymers which comprises dissolving from about 5 percent to about 13 percent polymeric butadiene rubber in a monomer solution comprising from about 1.5 to 9 parts by weight styrene per part by weight acrylonitrile, feeding the reaction solution to a primary reactor, polymerizing said reaction solution in the primary reactor, while maintaining the steady-state solids level in the primary reactor at about 15 to about 40 percent by weight solids during polymerization therein; and thereafter feeding the reaction mixture to a secondary reactor, polymerizing the reaction mixture in the secondary reactor, while maintaining the steady-state solids level in the secondary reactor at about 50 to about 75 percent by weight solids during polymerization therein.

2. Process claimed in claim 1 wherein said polymeric butadiene rubber contains less than about 75 percent by weight combined sytrene.

3. Process as claimed in claim 1 wherein the reaction solution being fed to the primary reactor contains an organic liquid diluent.

4. Process as claimed in claim 3 wherein the organic liquid diluent is present in the reaction solution in amounts of from about 15 to about 20 percent by weight.

5. Process as claimed in claim 1 wherein said monomer solution comprises about 2 to 3 parts by weight styrene per part by weight acrylonitrile.

6. Process as claimed in claim 1 wherein the unreacted monomer is removed from the effluent from the secondary reactor and the acrylonitrile/butadiene/styrene polymer is recovered.

7. Process for the preparation of high impact strength acrylonitrile/butadiene/styrene polymers which comprises dissolving from about 5 percent to about 13 percent butadiene/styrene copolymer containing from about 0 to about 35 percent by weight combined styrene and from about 65 to 100 percent by weight combined butadiene in a monomer solution comprising from about 2 to 3 parts by weight styrene per part by weight acrylonitrile, feeding the reaction solution to a primary reactor, polymerizing said reaction solution in the primary reactor, while maintaining the steady-state solids level in the primary reactor at about 25 to 75 percent by weight solids during polymerization therein; and thereafter feeding the reaction mixture to a secondary reactor, polymerizing the reaction mixture in the secondary reactor, while maintaining the steady state solids level in the secondary reactor at about 50 to about 75 percent by weight solids during polymerization therein.

8. Process as claimed in claim 7 wherein the reaction solution being fed to the primary reactor contains an organic liquid diluent.

9. Process as claimed in claim 8 wherein the organic liquid diluent is present in the reaction solution in amounts of from about 15 to about 20 percent by weight.

10. Process as claimed in claim 7 wherein the unreacted monomer is removed from the effluent from the secondary reactor and the acrylonitrile/butadiene/styrene polymer is recovered.

References Cited

UNITED STATES PATENTS 2,694,692   11/1954   Amos et al. _____ 260—880

FOREIGN PATENTS 641,549   5/1962   Canada.

MURRAY TILLMAN, *Primary Examiner.*

D. J. BREZNER, *Assistant Examiner.*